United States Patent
Phillips

Patent Number: 5,845,532
Date of Patent: Dec. 8, 1998

[54] YOKE APPARATUS FOR RACK AND PINION

[75] Inventor: Edward H. Phillips, Troy, Mich.

[73] Assignee: Techco Corporation, Southfield, Mich.

[21] Appl. No.: 677,449

[22] Filed: Jul. 2, 1996

Related U.S. Application Data

[63] Continuation-in-part of Ser. No. 630,369, Apr. 10, 1996.

[51] Int. Cl.$^6$ ............................................. F16H 1/04
[52] U.S. Cl. .................... 74/422; 74/89.11; 74/89.19; 384/37
[58] Field of Search .................. 74/422, 339, 89.11, 74/89.19; 384/37, 119

[56] References Cited

U.S. PATENT DOCUMENTS

| | | | |
|---|---|---|---|
| 3,499,691 | 3/1970 | Baier | 384/119 X |
| 3,680,443 | 8/1972 | Jenvey . | |
| 4,271,716 | 6/1981 | Carduner | 74/422 O |
| 4,402,618 | 9/1983 | Fortmann et al. | 384/107 O |
| 4,475,413 | 10/1984 | Higuchi . | |
| 4,515,486 | 5/1985 | Ide | 384/117 O |
| 4,683,769 | 8/1987 | Mochizuki et al. . | |
| 4,709,593 | 12/1987 | Takeuchi . | |
| 4,793,433 | 12/1988 | Emori et al. . | |
| 4,936,157 | 6/1990 | Kotake et al. . | |
| 4,939,947 | 7/1990 | Toyoshima et al. . | |
| 5,058,448 | 10/1991 | Kiyooka et al. . | |
| 5,203,216 | 4/1993 | Hasegawa . | |
| 5,265,691 | 11/1993 | Konishi et al. . | |
| 5,272,933 | 12/1993 | Collier et al. . | |
| 5,316,043 | 5/1994 | Phillips . | |

FOREIGN PATENT DOCUMENTS

| | | |
|---|---|---|
| 61-193966 | 8/1986 | Japan . |
| 6-92243 | 4/1994 | Japan . |

*Primary Examiner*—Charles Marmor
*Assistant Examiner*—David M. Fenstermacher
*Attorney, Agent, or Firm*—Gifford, Krass, Groh, Sprinkle, Patmore, Anderson & Citkowski, P.C.

[57] ABSTRACT

A yoke assembly for a rack and pinion steering system includes a bearing disc member having a pair of bearing surfaces for slidingly supporting and urging the rack toward the pinion. The bearing disc member is kinematically supported by an elastomeric member along an adjustment axis. The elastomeric forces are conically applied toward an apex located well within the rack and away from the bearing surfaces. This results in the bearing disc member rotating slightly in a contra-pitch direction and forming a lubrication wedge whenever the rack moves along its axis of translation. In addition, elastomeric means for compliantly biasing the bearing disc in a lateral direction orthogonal to a plane defined by the adjustment and translation axes toward a preferred central location are disclosed.

8 Claims, 3 Drawing Sheets

YOKE APPARATUS FOR RACK AND PINION

CROSS REFERENCE TO RELATED APPLICATIONS

The present invention is a continuation-in-part of U.S. Ser. No. 08/630,369 filed Apr. 10, 1996 and entitled "YOKE APPARATUS FOR RACK AND PINION.

BACKGROUND OF THE INVENTION

I. Field of the Invention

The present invention is directed to a yoke apparatus for use with a rack-and-pinion steering system.

II. Description of the Prior Art

Automotive steering systems typically include a housing having a rack driven by a pinion gear. Rotation of a steering wheel turns the pinion gear. The pinion gear meshes with a plurality of teeth formed on the rack to drive the rack in one of two reciprocal directions. The rack in turn is connected to a pair of dirigible wheels. In addition, many automobile steering systems comprise a rotary control valve which is operable to supply pressurized fluid to move a double-acting hydraulic cylinder or actuator to assist translation of the rack.

In order to keep the teeth of the pinion gear and the rack in engagement, such steering systems employ a yoke apparatus. The yoke apparatus includes a bearing member which is biased to force the rack towards the pinion gear. The bearing member has a pair of spaced apart bearing surfaces which slidingly contact the surface of the rack opposite the teeth of the rack. The bearing member is slidingly mounted in a bore which is formed in a nominally orthogonal manner with reference to the rack's intended position. This results in a nominal alignment of the bearing surfaces along an axis which extends coaxially with the axis of translation of the rack. A spring is mounted in the bore to force the yoke assembly against the rack and bias the bearing surfaces in order to force the teeth of the rack against the teeth of the pinion gear. Thus, the yoke apparatus operates to nominally guide the rack along the axis of translation and hold the teeth of the rack and the teeth of the pinion gear in mesh during the application of torque to the pinion gear.

In practice, it is not possible to maintain the axis of translation of the rack orthogonal to the axis of the bore. This is because of the tolerances involved in forming the bore, rack, and pinion gear. Accordingly, it has been found that the axis of translation of the rack may be angled with respect to the axis of the bearing surfaces of the bearing member, and may even undulate as a function of rotational motion of the pinion gear. When so missaligned, one end of each of the support surfaces engage the rack while opposite ends of the support surfaces are spaced away from the rack. As a further result, the bearing member itself may suffer angular misalignment within the bore and jam. In fact, such yoke assemblies may be said to be over constrained or to be of non-kinematic design.

For the above reasons, the rack is often held from smooth movement in one, or both, directions of travel. This is particularly so when the rack travels in a direction from the contacting ends towards the non-contacting ends of the support surface. The edges resist movement of the rack and the rack tends to hesitate and jerk in its movement. However, movement of the rack in an opposite direction tends to produce a smoother, less resistant movement. Frequently, the discontinuous or halting movement of the rack will be tactilly sensed by the driver.

The spring is located in an adjuster plug which is threadably inserted in the outer portion of the bore. During the assembly of the yoke apparatus, the adjuster plug is rotatably driven into contact with the bearing member with a nominal torque value of perhaps 50 in.lbs. to provide a rotational position reference. Because of the above noted tolerances involved in forming the bore, rack and pinion gear, there results a soft contact between the adjuster plug and the bearing member, and thus an imprecise rotational position reference. For this reason, the adjuster plug must then be backed off by an angle of about 30° in order to ensure interference free operation in the manner described above. This results in an indefinite stop position of the bearing member should a torque level be applied that is sufficient to overcome the spring bias.

In operation, rack and pinion assemblies are often subject to a condition known as "rattle". Rattle most often occurs when the dirigible wheels are subject to dissimilar impacts such as when crossing obliquely disposed railroad tracks or similar road surface discontinuities. It has been found that lateral and rotational motions and resulting impacts within the housing by the yoke apparatus elements are the most significant cause of rattle. This occurs because of the helically formed teeth on the pinion gear. As the pinion gear is caused to rotate by axial thrust loads imposed upon the rack with resulting axial motion thereof, the rack is driven laterally by the helically formed teeth of the pinion gear. In addition, physical separation followed by abrupt re-engagement of the rack and pinion gear interface as a consequence of the axial thrust loads contributes some rattle as well. In any case, rattle is typically treated by tightening up various clearances or adding a circumferential elastomeric guide element around the skirt of the yoke, and as a last resort, by significantly increasing the biasing spring force.

SUMMARY OF THE INVENTION

Accordingly, a primary object of the present invention is to provide a yoke apparatus having a true kinematic design wherein bearing surfaces are maintained in coaxial alignment with the axis of movement of the rack to provide smooth, constants movement of the rack in both directions of travel. Another object of the present invention is to provide a yoke apparatus enabling substantially rattle free operation of the rack and pinion assembly.

Accordingly, in a preferred embodiment of the present invention, an improved first yoke apparatus is presented wherein a bearing disc is biased to force the rack towards the pinion gear by an elastomeric O-ring member. The bearing disc is nominally constrained in the lateral directions with reference to a supporting adjuster plug by the O-ring member. This is accomplished by compressing the O-ring member between inner and outer angular contact grooves respectively formed on the bearing disc and adjuster plug, respectively. The adjuster plug is used to axially compress the O-ring member in order to provide the biasing force. Because of the compliant nature of the O-ring member, the above described over constraint is eliminated.

As a consequence of its axially directed compression, the O-ring member provides nominal pitch and yaw constraints upon the bearing disc which are conically directed toward an apex. The actual location of the apex is determined by the relative final locations of the lines of force through the angular contact grooves. In any case, the pitch constraint is directed about the apex which is located well within the rack and thus physically remote from the bearing disc. Upon initial translation of the rack, the bearing disc begins to move along with the rack. This tends to decompress the portion of the O-ring member under the leading edge of the bearing disc and further compress the portion of the O-ring member under the trailing edge of the bearing disc. The end result is a contra-pitch rotation of the bearing disc about the apex so as to form a lubrication wedge between it and the rack. Thus, the bearing surfaces of the bearing disc can compliantly align with the preferred axis of movement of the rack in a manner that provides enhanced lubrication.

In practice it has been found that while the improved yoke assembly of the preferred embodiment does provide for smooth, rattle-free movement of the rack, the helically formed teeth on the pinion gear tend to initially drive the rack laterally. This, in turn, may cause the host rack and pinion assembly to exhibit a lack of on-center crispness. This is due to a lack of initial translational motion of the rack during the period when it is moving laterally.

Therefore, in a first alternative preferred embodiment of the present invention, an improved second yoke apparatus is presented wherein laterally disposed elastomeric members are utilized to markedly increase yaw stiffness of the bearing disc. The laterally disposed elastomeric members are captured between grooves formed in sides of the bearing disc located outwardly from its bearing surfaces, and juxtaposed nominally axially directed grooves formed within the bore. In order to ease assembly, the lateral grooves formed in the bearing disc comprise lead-in tapers so that compression of the laterally disposed elastomeric members occurs gradually as a function of the axial assembly of the bearing disc.

In the improved second yoke apparatus, the O-ring described above (i.e., with reference to the preferred embodiment) is replaced with an elastomeric member formed directly within the adjuster plug. This eliminates handling a separate elastomeric member during assembly. In this case, the elastomeric member is formed within an outer angular contact region such that the resulting force direction is similar to that of the preferred embodiment.

In a second alternative preferred embodiment of the present invention, an improved third yoke apparatus is presented wherein both of the above described types of elastomeric members are formed in a second operation directly within the bearing disc. Because it is difficult to bond elastomeric materials to materials which are suitable for forming the bearing disc, the bearing disc is formed with mechanically interlocking features for the elastomeric members. So forming the elastomeric members eliminates handling separate elastomeric members during assembly. And in this case, no grooves are required within the bore. The bore is simply formed in a conical manner as will be described below.

In either of the first or second alternative preferred embodiments of the present invention, the laterally disposed elastomeric members provide a substantial increase in yaw stiffness for the bearing disc. Thus, the helically formed teeth on the pinion gear are substantially precluded from driving the rack laterally. This, in turn, substantially enhances on-center crispness.

In any of the preferred embodiments of the present invention, all of the necessary constraints are elastomerically provided. Thus, the bearing disc is not required to be slidingly mounted in a bore in the housing. And, there is no possibility of rattle occurring via contact between the bearing disc and such a bore. In addition, because all of the constraints are elastomerically provided, engagement of the teeth of the pinion gear and the rack is maintained in a less abrupt manner. Should physical separation therebetween result from a dissimilar impact, re-engagement is softer and somewhat damped. In this way, rattle due to gear re-engagement is minimized as well.

BRIEF DESCRIPTION OF THE DRAWINGS

The foregoing and other objects and advantages of the present invention will become readily apparent to those skilled in the art upon studying the following detailed description, when considered in connection with the accompanying drawings, in which.

DETAILED DESCRIPTION OF THE PREFERRED EMBODIMENTS

Figure 1:
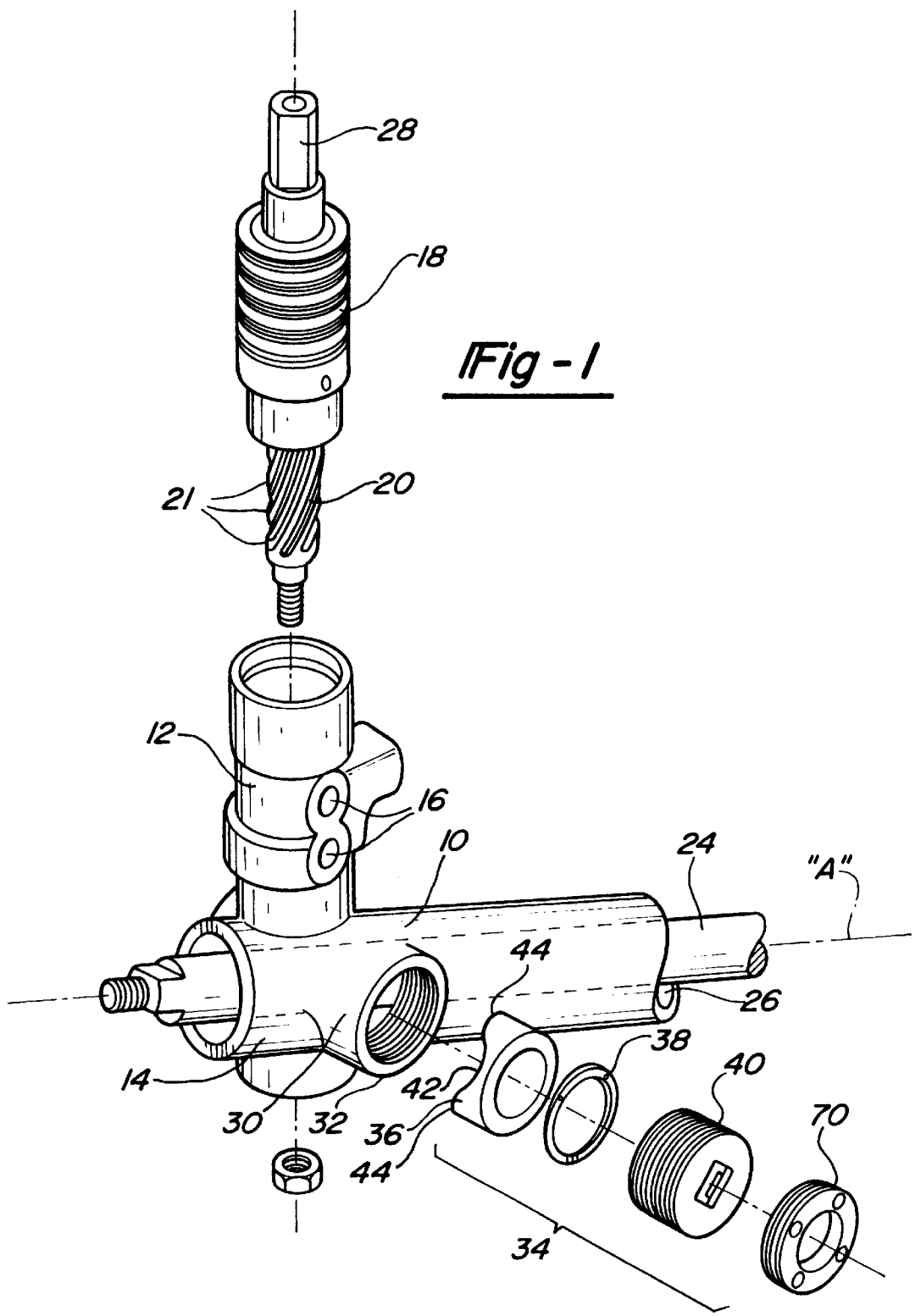
FIG. 1 is an exploded perspective view of a steering gear assembly including a yoke apparatus configured in accordance with a preferred embodiment of the invention.

Referring now to the exploded perspective view of FIG. 1, thereshown is a portion of a steering apparatus for a vehicle. The steering apparatus includes a conventional housing 10, such as manufactured by the Saginaw Steering Systems Division of Delphi Automotive Systems, of Saginaw, Mich. The housing includes a barrel 12 extending upwardly from a cylinder 14. The barrel 12 houses a rotary control valve assembly 18 for providing pressurized hydraulic fluid through ports 16 to a hydraulic actuator (not shown) for providing hydraulic assist to the steering system. Included in the rotary control valve assembly 18 is a pinion gear 20.

Figure 3:
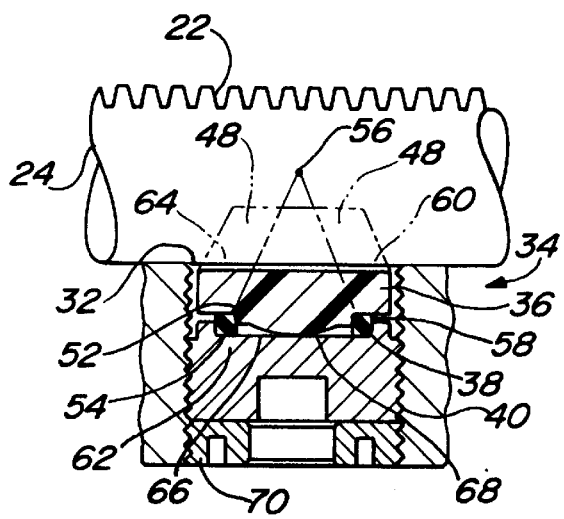
FIG. 3 is a sectional side view of the yoke apparatus of the preferred embodiment of the invention.

The pinion gear 20 comprises helically formed teeth 28 and is mounted at a non-orthogonal angle in order to mesh with a plurality of teeth 22 formed in a transverse manner on a rack 24. As shown most clearly in FIG. 3, the teeth 22 extend in a nominally axial direction along the surface of the rack 24. As is known in the art, input shaft 29 of the rotary control valve assembly 18 is connected to a steering wheel (not shown) to enable steering of a host vehicle.

The rack 24 is mounted for reciprocal movement along an axis of translation "A" in an elongated cavity 26 of the housing 10. Rotational movement of the pinion gear 20 by the steering wheel and rotary control valve assembly 18 will cause reciprocal translation of the rack 24 along the axis of translation "A". As is known in the art, the rack 24 is connected to dirigible wheels (also not shown) to steer the vehicle.

As shown in FIG. 1, a cylindrical sleeve 30 is formed on one side of the cylinder 14 of the housing. The cylindrical sleeve 30 includes a threaded aperture 32 for accepting an improved yoke assembly 34 comprised in a preferred embodiment of the present invention. The threaded aperture 32 extends in a substantially orthogonal direction with reference to the axis of translation "A" of the rack 24.

The improved yoke assembly 34 includes a bearing disc 36, an elastomeric O-ring member 38 and an adjuster plug 40. When the improved yoke assembly 34 is assembled within the cylindrical sleeve 30, the bearing disc 36 is biased against the rack 24 by compression of the O-ring member 38 as is depicted more clearly in FIGS. 2 and 3.

Figure 2:
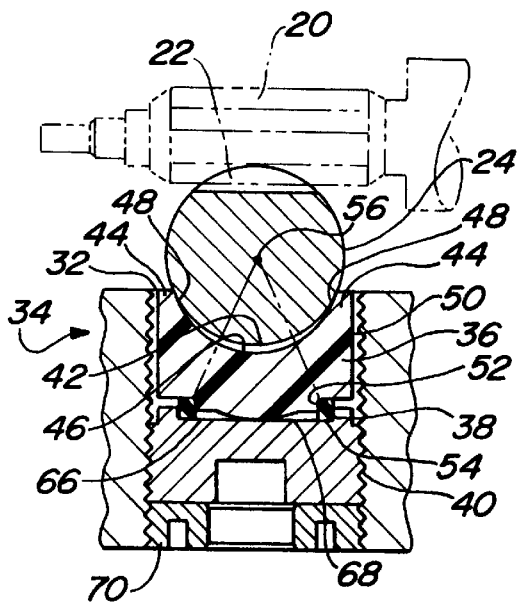
FIG. 2 is a sectional view of the yoke apparatus of the preferred embodiment of the invention.

As particularly shown in FIG. 2, one side of the bearing disk 36 has a curvilinear slot 42 defining a pair of arms 44. The slot 42 includes a cutaway center portion 46 extending between a pair of elongated bearing surfaces 48. The bearing surfaces 48 are spaced apart to guide the rack 24 during movement thereof. The bearing disc 36 has a circumferential outer surface 50 having a diameter less than the threaded aperture 32 of the cylindrical sleeve 30. The diametral operating clearance so obtained precludes the possibility of contact between the bearing disc 36 and the threaded aperture 32 and eliminates any possibility of rattle from that source.

The other side of the bearing disc 36 has an inner angular contact groove 52 and the juxtaposed side of the adjuster plug 40 has an outer angular contact groove 54. During assembly, the O-ring member 38 is compressed between angular contact grooves 52 and 54 to provide a biasing force that urges the bearing disc 36 into contact with the rack 24. Except for the lubrication wedge described below, the interface between the bearing surfaces 48 and the rack 24 provides lateral, radial, pitch and roll constraints for the bearing disc with respect to the axis of translation "A". Lateral positioning of both the bearing disc 36 and the rack 24, as well as the remaining axial and yaw constraints for the bearing disc 36, are provided by the compressed O-ring member 38 in a somewhat compliant manner with respect to the threaded aperture 32.

As a consequence of its axially directed compression between the angular contact grooves 52 and 54, the O-ring member 38 also provides nominal pitch and yaw constraints upon the bearing disc 36 which are conically directed toward an apex 56. The actual location of the apex 56 is determined by the relative final locations of the lines of force through the angular contact grooves 52 and 54. In any case, the pitch constraint is directed about the apex 56 which is well within the rack 24 and thus physically remote from the bearing disc 36. Upon initial translational motion of the rack 24, the bearing disc 36 begins to move along with the rack 24. This tends to decompress leading edge portion 58 of the O-ring member 38 (i.e., that portion under the leading edge 60 of the bearing disc) and further compress trailing edge portion 62 of the O-ring member 38 (i.e., that portion under the trailing edge 64 of the bearing disc). The end result is a contra-pitch rotation of the bearing disc 36 about the apex 56 so as to form a lubrication wedge between it and the rack 24. The kinematic design of the improved yoke assembly 34 permits the axis of the bearing surfaces 48 of the bearing disc 36 to be in precise alignment with the rack 24 and maintain a lubrication wedge therebetween which enables smooth movement of the rack 24.

During assembly, the adjuster plug 40 is threadably inserted into threaded aperture 32 and rotatably driven until surface 66 thereof contacts convex surface 68 of the bearing disc 36. Then the adjuster plug 40 is rotationally backed off a minimal predetermined distance, such as 10°, in order to permit some movement of the bearing disc 36 and rack 24. An internal lock nut 70 is then tightened against the adjuster plug 40 to maintain its position.

The minimal predetermined distance of 10° is significantly less than that normally encountered when assembling yoke assemblies of the prior art. This is enabled by the extra degree of freedom provided by the improved yoke assembly 34 whereby the tightening of the adjuster plug 40 against the bearing disc 36 can be accomplished in a more precise manner. The result is tighter control of the operating clearance between the adjuster plug 40 and bearing disc 36. This is important in minimizing rattle because it results in minimal possible separation between the pinion gear 20 and rack 24 as a consequence of dissimilar dirigible wheel impacts. This, in turn, minimizes the maximum closure velocity therebetween which minimizes any audible noise associated with closure.

In practice it has been found that while the improved yoke assembly 34 does provide for smooth, rattle-free movement of the rack 24, the helically formed teeth 28 on the pinion gear 20 tend to initially drive the rack 24 laterally. This, in turn, may cause the steering apparatus to exhibit a lack of on-center crispness. This is due a lack of initial translational motion of the rack 24 during the period when it is moving laterally.

Figure 4:
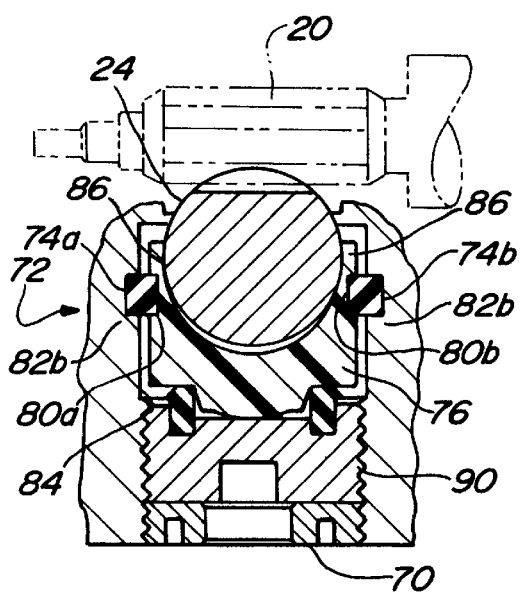
FIG. 4 is a sectional view of a yoke apparatus configured in accordance with a first alternative preferred embodiment of the invention.
Figure 5:
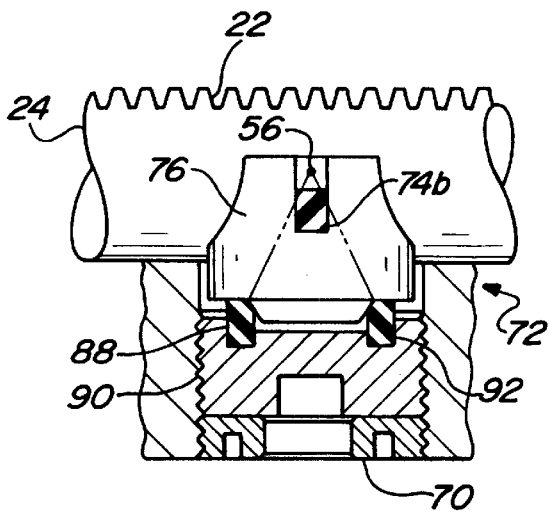
FIG. 5 is a sectional side view of the yoke apparatus of the first alternative preferred embodiment of the invention.

Therefore, as shown in FIGS. 4 and 5, an improved yoke assembly 72 is presented wherein laterally disposed elastomeric members 74a and 74b are utilized to markedly increase yaw stiffness of bearing disc 76. The laterally disposed elastomeric members 74a and 74b are respectively captured between lateral grooves 78a and 78b formed in sides 80a and 80b of the bearing disc 76, and respectively juxtaposed axially directed grooves 82a and 82b formed within bore 84. In order to ease assembly, the lateral grooves 78a and 78b comprise lead-in tapers 86 so that lateral compression of the laterally disposed elastomeric members 74a and 74b occurs gradually as a function of the axial assembly of the bearing disc 76.

In addition, the O-ring 38 described above (i.e., with reference to yoke assembly 34) is replaced with an elastomeric member 88 formed directly within adjuster plug 90. This eliminates handling a separate elastomeric member during assembly. In this case, elastomeric member 88 is formed within a nominally outer angular contact region 92 of the adjuster plug 90. In so doing, the resulting conically directed pitch constraint is directed toward apex 56 in a manner similar to that described above with reference to the improved yoke assembly 34.

Figure 6:
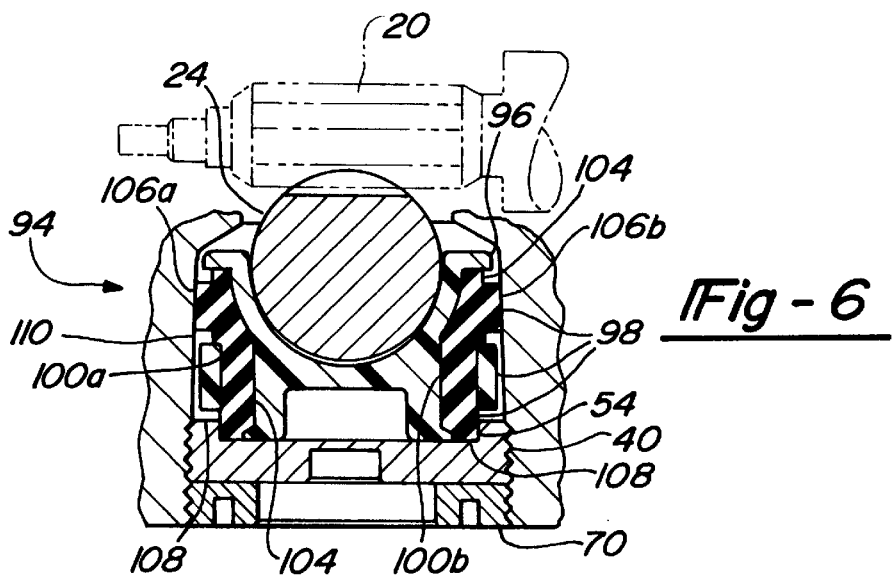
FIG. 6 is a sectional view of a yoke apparatus configured in accordance with a second alternative preferred embodiment of the invention.
Figure 7:
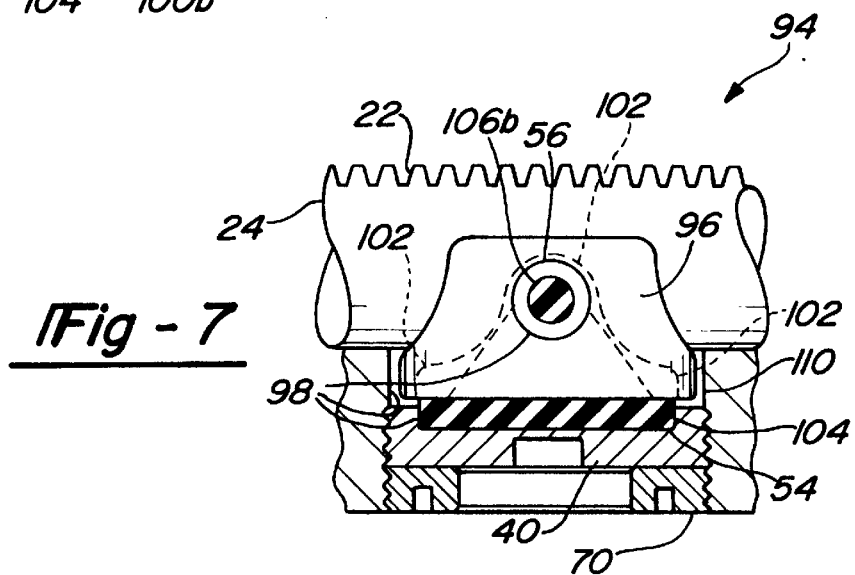
FIG. 7 is a sectional side view of the yoke apparatus of the second alternative preferred embodiment of the invention.
Figure 8:
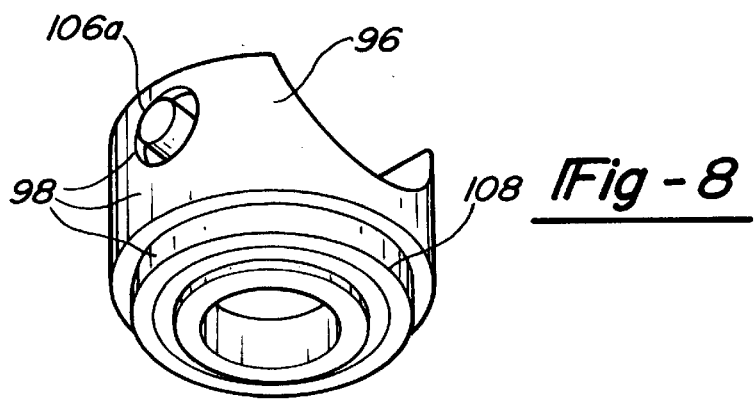
FIG. 8 is an isometric view of a bearing disc used in the second alternative preferred embodiment of the invention.

Shown in FIGS. 6, 7 and 8 is an improved yoke assembly 94 wherein both of the above described types of elastomeric members are formed in a second operation directly within bearing disc 96 to form a composite yoke member 98. This eliminates handling separate elastomeric members during assembly. In this case the bearing disc 96 is formed with mechanically interlocking shapes comprising passages 100a and 100b, and pocket regions 102. Then, in the second forming operation, elastomeric member 104 comprising laterally disposed protrusions 106a and 106b, and outwardly directed axial rib 108, is formed within bearing disc 96 as is best shown in FIG. 8.

Because the laterally disposed protrusions 106a and 106b are mechanically located with reference to the bearing disc 96, no juxtaposed axially directed grooves, such as axially directed grooves 82a and 82b, are required within bore 110. Instead, bearing disc 96 and bore 110 are formed in a conical manner so that compression of the laterally disposed protrusions 106a and 106b occurs as a function of the axial assembly of the composite yoke member 98. Similarly, pitch constraints are directed toward apex 56 via compression of outwardly directed axial rib 108 by outer angular contact groove 54 of adjuster plug 40.

In either of the improved yoke assemblies 72 or 94, respective laterally disposed elastomeric members 74a and 74b, or laterally disposed protrusions 106a and 106b, provide a substantial increase in yaw stiffness for either of the bearing discs 76 or 96. Thus, the helically formed teeth 28 on the pinion gear 20 are substantially precluded from driving the rack 24 laterally. This, in turn, substantially enhances on-center crispness.

In any of the improved yoke assemblies 34, 72 or 94, all of the necessary constraints are elastomerically provided. Thus, the bearing discs 36, 76 or 96 are not required to be slidingly mounted in a bore in the housing. And, there is no possibility of rattle occurring via contact between the respective bearing disc and such a housing bore. In addition, because all of the constraints are elastomerically provided, engagement of the helically formed teeth 28 of the pinion gear 20 and the teeth 22 of the rack 24 is maintained in a less abrupt manner. Should physical separation therebetween result from a dissimilar impact on the dirigible wheels, re-engagement is softer and somewhat damped. In this way, rattle due to gear re-engagement is minimized as well.

While the present invention has been described in connection with the preferred embodiments of the various figures, it is also understood that other similar embodiments may be used or modifications or additions may be made to the described embodiments for performing the same function of the present invention without deviating therefrom. For instance, the preferred embodiment could be implemented by directly forming a circumferential elastomeric element in either of the bearing disc 36 or adjuster plug 40 in the manner of elastomeric member 88 formed within adjuster plug 90 and comprised in the improved yoke assembly 72. Therefore, the present invention should not be limited to any single embodiment but, rather, construed in breadth and scope in accordance with the recitation of the appended claims.

I claim:

1. An apparatus for mounting a rack and pinion in meshing engagement, said rack movable on an axis of translation within a housing, said housing having a bore formed on an adjustment axis which is nominally orthogonal and intersects said axis of translation, said apparatus comprising:

a plug member mounted within said bore;

a bearing disc member compliantly mounted in said bore, said disc member having a nominally cylindrical surface formed in a top portion and spaced apart from a lower surface, said cylindrical surface formed to support said rack, said disc member having a peripheral surface extending from said lower surface to said top portion, said peripheral surface being spaced inwardly from an inner surface of said bore such that said disc member is movable from alignment with said adjustment axis;

first means for biasing mounted between said lower surface of said bearing disc member and said plug; and second means for biasing having a pair of resilient portions disposed between said bearing disc member and said bore 180° apart on an axis extending through said cylindrical surface and orthogonal to said adjustment axis whereby said disc member is resiliently supported in said bore against yaw to resist displacement of the rack in a lateral direction.

2. The apparatus of claim 1, having said first biasing means formed of elastomeric material and having said adjuster plug member and said lower surface of said bearing disc member formed with means for receiving said first biasing means.

3. The apparatus of claim 1 having said second compliantly biasing means formed of elastomeric material and having said bore of said housing and said bearing disc member formed with means for receiving said compliantly biasing means.

4. The apparatus of claim 1 having said first compliantly biasing means and said second compliantly biasing means formed of elastomeric material positioned within said bearing disc member.

5. The apparatus of claim 4 wherein said bearing disc member comprises mechanically interlocking shapes and said elastomeric material is formed within said mechanically interlocking shapes of said bearing disc member.

6. The apparatus of claim 1, wherein said first and second 2 biasing means comprises a unitarily formed elastomeric member.

7. The apparatus of claim 1, wherein said first biasing means comprises an O-ring.

8. The apparatus of claim 1, wherein said second biasing means comprises a pair of elastomeric pads.

* * * * *

UNITED STATES PATENT AND TRADEMARK OFFICE
CERTIFICATE OF CORRECTION

PATENT NO. : 5,845,532
DATED : December 8, 1998
INVENTOR(S) : Edward H. Phillips It is certified that error appears in the above-identified patent and that said Letters Patent is hereby corrected as shown below:

Abstract, line 11, delete "means" and insert --members--.

Column 2, line 43, delete "constants" and insert --constant--.

Column 4, line 41, after "as", insert --that--;

line 50, delete "28" and insert --21--;

line 55, delete "29" and insert --28--.

Column 6, line 21, delete "28" and insert --21--;

UNITED STATES PATENT AND TRADEMARK OFFICE
CERTIFICATE OF CORRECTION

Page 2 of 2

PATENT NO. : 5,845,532
DATED : December 8, 1998
INVENTOR(S) : Edward H. Phillips It is certified that error appears in the above-identified patent and that said Letters Patent is hereby corrected as shown below:

line 24, after "due" insert --to--.

Column 7, line 10, delte "28" and insert --21--;

line 21, delete "28" and insert --21--.

Column 8, Claim 6, line 42, after "second" delete "2".

Signed and Sealed this

Twenty-seventh Day of July, 1999

Attest:

Q. TODD DICKINSON

*Attesting Officer*  *Acting Commissioner of Patents and Trademarks*